United States Patent
Puetter et al.

[19]

[11] Patent Number: 5,912,993
[45] Date of Patent: Jun. 15, 1999

[54] SIGNAL ENCODING AND RECONSTRUCTION USING PIXONS

[75] Inventors: Richard C. Puetter; Robert K. Pina, both of San Diego, Calif.

[73] Assignee: Regents of the University of Calif., San Diego, Calif.

[21] Appl. No.: 08/073,929

[22] Filed: Jun. 8, 1993

[51] Int. Cl.⁶ ........................... G06T 5/00
[52] U.S. Cl. .................. 382/275; 382/228
[58] Field of Search ............... 382/54, 56, 39, 382/30, 34, 254, 232, 275, 173, 255, 228; 358/463

[56] References Cited

U.S. PATENT DOCUMENTS

| | | | |
|---|---|---|---|
| 3,839,702 | 10/1974 | Chaires et al. | 382/39 |
| 4,894,795 | 1/1990 | Whitehouse et al. | 364/807 |
| 4,910,786 | 3/1990 | Eichel | 382/22 |
| 4,916,745 | 4/1990 | Hart et al. | 382/39 |
| 4,941,193 | 7/1990 | Barnsley et al. | 340/499 |
| 4,973,111 | 11/1990 | Haacke et al. | 324/309 |
| 4,993,075 | 2/1991 | Sekihara et al. | 382/6 |
| 4,998,064 | 3/1991 | Fuderer et al. | 324/309 |
| 5,014,134 | 5/1991 | Lawton et al. | 358/261.3 |
| 5,054,101 | 10/1991 | Prakash | 382/50 |
| 5,055,789 | 10/1991 | Kondo et al. | 324/309 |
| 5,101,446 | 3/1992 | Resnikoff et al. | 382/56 |
| 5,113,367 | 5/1992 | Marrian et al. | 364/819 |
| 5,130,563 | 7/1992 | Nabet et al. | 307/201 |
| 5,134,884 | 8/1992 | Anderson | 73/625 |
| 5,148,497 | 9/1992 | Pentland et al. | 382/54 |
| 5,191,393 | 3/1993 | Hignette et al. | 356/384 |
| 5,233,541 | 8/1993 | Corwin et al. | 382/54 |

OTHER PUBLICATIONS

Geman et al "Stochastic Relaxation, Gibbs Distributions, and the Bayesian Restoration of Images" IEEE PAMI Nov. 1984 721–741.

"Incorporation of Spatial Information in Bayesian Image Reconstruction: The Maximum Residual Likelihood Criterion", R. K. Piña and R. C. Puetter, Pub. of the Astronomical Soc. of the Pacific 104; 1096–1103, '91 Nov.

"Applications of Maximum Entropy Techniques to HST Data", Nicholas Weir, Proceedings of the ESO/St–ECF Data Analysis Workshop, Apr. 1991.

Bayesian Image Reconstruction in Positron Emission Tomograph, by Chin–Tu Chen, et al., *IEEE Tansactions on Nuclear Science*, vol. 37, Issue 2, Apr. 1990 pp. 636–641.

Representing Probability Distributions of Image Segments and Segmentations, by Steven M. LaValle and Seth A. Hutchinson *Systems, Man, and Cybernetics, 1992 International Conference,* 1992, pp. 1552–1557.

Pixons and Bayesian Image Reconstruction, by R.C. Puetter, Reprint from *Image Reconstruction and Restoration,* Jul. 25–26, 1994, vol. 2302, pp. 112–131.

Stochastic Relaxation, Gibbs Distributions, and the Bayesian Restoration of Images, by Stuart Geman and Donald Geman, *IEEE Transactions on Pattern Analysis and Machine Intelligence,* vol. PAMI–6, No. 6, Nov. 1984, pp. 721–741.

*Primary Examiner*—Amelia Au
*Assistant Examiner*—Larry J. Prikockis
*Attorney, Agent, or Firm*—Brown, Martin, Haller & McClain

[57] ABSTRACT

The method identifies a pixon, a fundamental and indivisible unit of information, and a pixon basis, which represents the smallest number of cells of arbitrary shape or position required to fit the data, representing the minimum degrees of freedom necessary to specify the image. The goodness-of-fit is determined according to the Maximum Residual Likelihood (MRL) statistic or a similar chi-squared statistic.

21 Claims, 2 Drawing Sheets

SIGNAL ENCODING AND RECONSTRUCTION USING PIXONS

The government has rights in this invention pursuant to Grant Nos. AST-8819116 and AST-8922006 awarded by the National Science Foundation.

BACKGROUND OF THE INVENTION

Exact measurement of the properties of nature is a common goal within the experimental sciences. Similarly, medical diagnostics and communications technology, among other scientific endeavors, seek the ability to obtain exact measurement of properties within their respective fields, e.g., MRI or free space optical transmission. However, in spite of the availability of highly sophisticated instruments, instrumental signatures are present in the data, making the measurement only approximate. An area of experimental science in which instrumental signatures are particularly a problem is astronomy, where the sources to be measured are very faint. Even when the instruments are made essentially noise-free, instrumental signatures related to finite spatial, spectral, or temporal resolution remain. At this point, image reconstruction is required to remove the instrumental signatures.

One of the most powerful approaches to image restoration, e.g., removal of point-spread-function blurring, is Bayesian image reconstruction, which includes goodness-of-fit and maximum entropy. This family of techniques employs a statistical relationship between various quantities involved in the imaging process. Specifically, the data, D, consisting of the original noisy, blurred image is linked to the noise-free, unblurred image, I, through a model, M. The model M includes all aspects of the relationship between the data and the image, e.g., that the data is normally collected on a rectangular grid and that the data is related to the image through the relationship $$D(i)=(I*H)(i)+N(i), \qquad (1)$$

where $D(i)$ is the data in cell i (typically a pixel), I is the image, H is the point-spread-function (PSF), * is the spatial convolution operator, i.e., $$(f*g)(x) = \int_{-\infty}^{\infty} dx' f(x')g(x-x') \qquad (2)$$

and N represents the noise in the data.

To statistically model the imaging process, the properties of the joint probability distribution of the triplet, D, I and M, i.e., p(D,I,M), are analyzed. Applying Bayes' Theorem [p(A,B)=p(A|B)p(B)=p(B|A)p(A), where p(X|Y) is the probability of X given that Y is known) provides:

$$p(D, I, M) = p(D \mid I, M)p(I \mid M)p(M) \qquad (3)$$
$$= p(I \mid D, M)p(D \mid M)p(M)$$

By setting the first factorization of p(D,I,M) in equation 3 equal to the second factorization provides the usual starting point for Bayesian reconstruction:

$$p(I \mid D, M) = \frac{p(D \mid I, M)p(I \mid M)}{p(D \mid M)} \qquad (4)$$

The goal of Bayesian image reconstruction is to find the M.A.P. (Maximum A Posteriori) image, I, which maximizes p(I|D,M), i.e., the most probable image given the data and model. (Note that other image estimates, e.g., the average image, $<I>=\int_{D,M} dMdD\, I\, p(I|D,M)$, may be used here and in the methods described in the detailed description.)

It is common in Bayesian image reconstruction to assume that the model is fixed. In this case, p(D|M) is constant, so that $$p(I|D,M)\, p(D|I,M)p(I|M). \qquad (5)$$

The first term, p(D|I,M), is a goodness-of-fit quantity, measuring the likelihood of the data given a particular image and model. The second term, p(I|M), is normally referred to as the "image prior", and expresses the a priori probability of a particular realization of the image given the model. In goodness-of-fit (GOF) image reconstruction, p(I|M) is effectively set to unity, i.e., there is no prior bias concerning the image. Only the goodness-of-fit (p(D|I,M)) is maximized during image reconstruction. Typically, $$p(I|D,M)=p_{\chi^2}(\chi^2_R), \qquad (6)$$

where $\chi^2_R$ is the chi-square of the residuals, R (=D−I*H), and $p_{\chi^2}$ is the $\chi^2$- distribution. While this approach ensures that the frequency distribution of the residuals has a width which is characteristic of the noise distribution, it normally results in images with spurious spatial features where the data has a low signal to noise ratio (SNR). Also, the large amplitude residuals often show a strong spatial correlation with bright features in the data.

Maximum entropy (ME) image reconstruction solves many of the problems of the simpler GOF methods. In ME imaging, one calculates a value for the image prior based upon "phase space volume" or counting arguments. Heuristically, p(I|M) is written p(I|M)=exp(S), where S is the entropy of the image in a given model. All ME methods capitalize on the virtues of incorporating prior knowledge of the likelihood of the image. The benefits of this are numerous, including eliminating the over-resolution problems of GOF methods and increasing the numerical stability of the calculations.

Many Bayesian image reconstruction methods assume that the model is fixed. However, recent advances in ME reconstruction propose varying the model. A significant development in this area is the multi-channel image modeling of Weir (Applications of *Maximum Entropy Techniques to HST Data,* Proceedings of the ESO/ST-ECF Data Analysis Workshop, April 1991). In this method the image is assumed to be a sum of pseudo-images convolved with a blurring function of various spatial scales. This method, while superior to many of its predecessors, may exhibit low-level spurious sources as ripples in the reconstructed image, and still displays some spatial correlation within the residuals.

SUMMARY OF THE INVENTION

It is an advantage of the present invention to provide a method for identifying a generalized image cell as an optimal basis for image reconstruction.

It is another advantage of the present invention to provide a method for minimizing the degrees of freedom necessary to reconstruct an image.

It is a further advantage of the present invention to provide a method for Bayesian estimation of an encoded signal when the underlying signal can be localized.

The method identifies a pixon, a fundamental and indivisible unit of information, and a pixon basis, which represents the smallest number of cells of arbitrary shape or position required to fit the data, representing the minimum degrees of freedom necessary to specify the image. The goodness-of-fit is determined according to the Maximum Residual Likelihood (MRL) statistic or a similar chi-squared statistic.

Pixon-based image reconstruction is derived from the premise that an image is a collection of distinguishable events which occur in distinct cells or spatial location. In application to astronomy, the input data is commonly obtained with a CCD detector array with a particular pixel size and shape. For example, in the imaging of star fields, the image would be best represented as a sum of point sources with arbitrarily precise positions and brightnesses. Since large regions of the data field will have few, if any, photon counts, portions of the pixel grid are unused, and the degrees of freedom, i.e., pixels, representing these portions of the image over-specify the data. In other portions of the image, the density of pixels may be too sparse to adequately represent the image. The pixon's size, shape, and position is based on the local SNR or information density. The probability of obtaining an image given the model (p(I|M)) is maximized by using the smallest number of cells (pixons) containing the largest amount of information. The number of pixons used in the image representation is typically much fewer than the total number of pixels in the grid, consequently, the prior term in equation 5 (in the Background of the Invention) is greatly improved.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENT

In an imaging system, a CCD detector having a grid of N×N pixels is used to collect incoming photons from the light source to generate an input image. A computer is used to reconstruct the input image using a form of Bayesian image restoration, in which a statistical description is applied to the imaging process and the most probable image is selected from all possible images. The model is determined through a number of iterations to find the best goodness-of-fit value. A key element in developing the statistical model by which the most probable image is found is that the model should contain the fewest number of cells with each containing the largest number of events consistent with maintaining an adequate goodness-of-fit (GOF). These cells are "pixons". The modeling process is explained in detail below.

Figure 1:
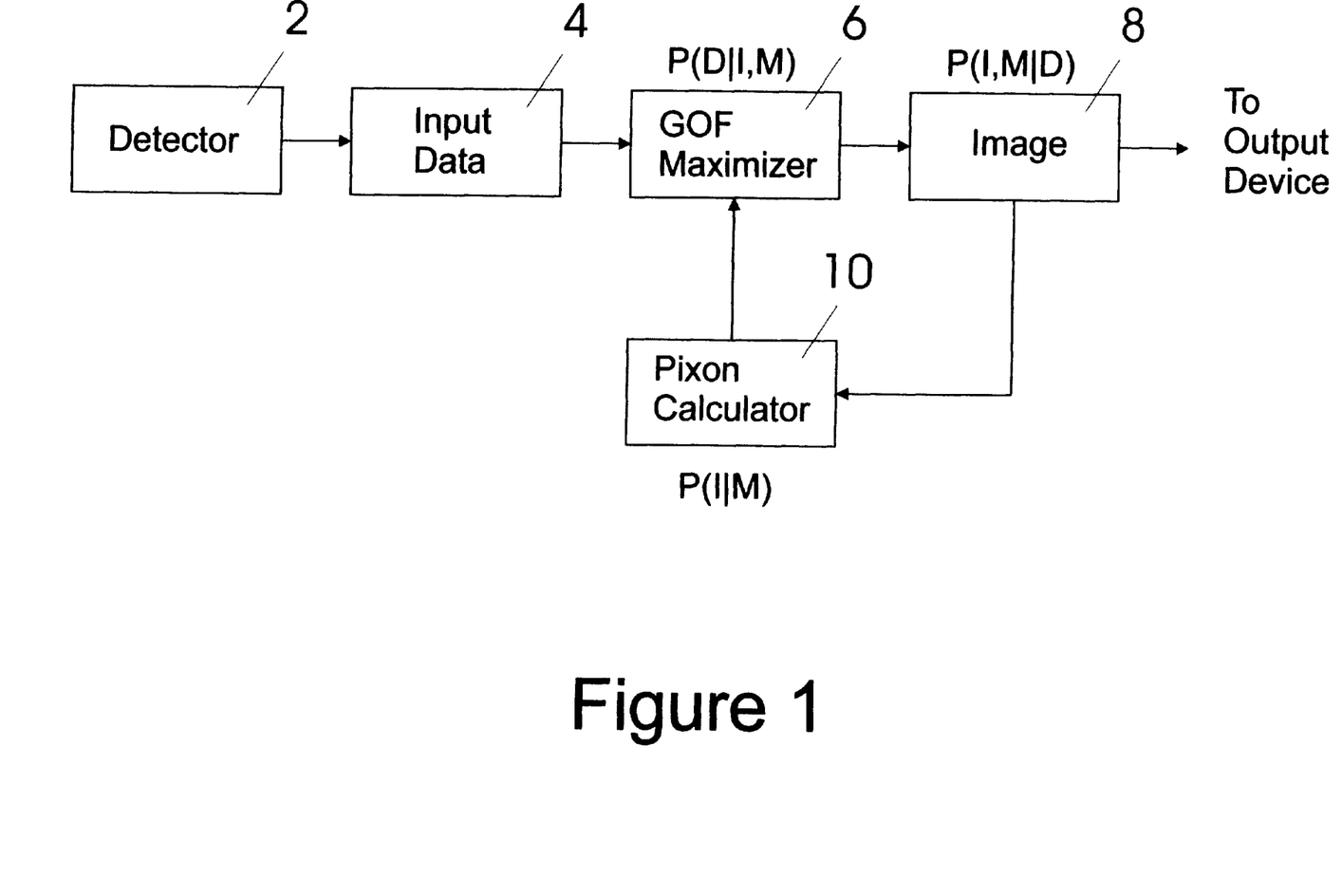
FIG. 1 is a block diagram of the steps in reconstructing an image according to the present invention.
Figures 2, 4A:
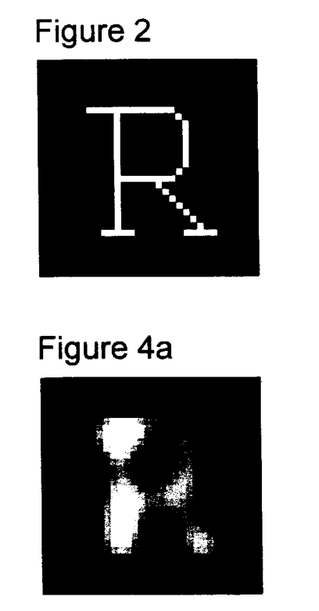
FIG. 2 is a diagram of a sample image which is to be reconstructed using the inventive method.
FIGS. 4a through 4c are diagrams of a reconstructed image (4a), a surface plot of the reconstructed image (4b), and the residuals(4c), using the prior art method of MRL reconstruction.

The generalized process flow is illustrated in FIG. 1. A detector/input means 2 collects the incoming signal to produce data 4. The data is fed into the GOF maximizer 6, in which the probability of the data given the image and model (p(D|I,M)) is maximized to produce an image 8, which is the most likely image and model given the data. This image 8, along with any other prior information, is used to update the pixon map at pixon calculator 10 and thereby improve the image prior (p(I|M)).

While the exemplary embodiment is described as applied to image reconstruction, the inventive method is equally applicable to other forms of signal processing which would benefit by minimizing the degrees of freedom. For example, the detector/input means could be an array of infrared detectors which provide time series data for construction of an image, or the detector/input means could be an RF modulator which is providing a signal which is to be compressed before transmission.

In the reconstruction method of the present invention, both the image and the model vary, causing the mathematical formulation to be somewhat different from that of equation 4. Using Bayes' theorem to expand p(D,I,M,):

$$p(D, I, M) = p(D \mid I, M)p(I \mid M)p(M) \quad (7)$$
$$= p(I, M \mid D)p(D).$$

Solving for p(I,M|D) gives:

$$p(I, M \mid D) = \frac{p(D \mid I, M)p(I \mid M)p(M)}{p(D)} \quad (8)$$

The goal is to select the combination of I and M which maximizes p(I,M|D), i.e., to pick the most likely combination of image and model given the data (M.A.P. image/model pair). This can be simplified by assuming that, since D is fixed, p(D) is a constant (=1) and can be ignored. Also, since there is no basis for prejudging between models of the data, p(M) is constant for all models. This implies that $$p(I,M|D) \, p(D|I,M)p(I|M). \quad (9)$$

Equation 9 is nearly identical to equation 5 except that M can vary as well as I, allowing a new interpretation of p(I|M), which is, in effect, the Bayesian incarnation of Occam's Razor. The presence of this term ensures that simple models are greatly preferred over complex models. More complex terms are only tolerated if they significantly improve the goodness-of-fit. Equation 9 is the basis for the optimal image modeling approach.

Now that the mathematical basis is determined for an optimal imaging model, the characteristics of the model need to be established. In its most general terms, an image is a collection of N distinguishable events that fall into n cells. For example, using the case of astronomical imaging of a star field with an r by s pixel optical CCD detector, the model grid has n=rs, since there are rs pixels or data cells. Next, suppose that $x_i$ is the number of photons collected in pixel i in an hour exposure of a star field. Further suppose that the noise per pixel is dominated by the sky brightness (i.e., the noise is constant across the CCD frame) and is equal to $\sigma$ photons. The number of distinguishable events in the image is of the order $X/\sigma$, where $X=\Sigma^n_{i-1} X_i$. N is the integrated signal to noise ratio of the image. The probability of obtaining the set $\{N_i\}$, where $N_i$ is the number of distinguishable events in cell i, can be determined from simple counting arguments and is given by $$p(\{N_i\}, n, N) = \frac{N!}{n^N \prod_{i=0}^{n} N_i!},$$ (10)

where the events are assumed to be indistinguishable. Similarly, if the image is expressed in terms of the data pixel grid, $$p(\{N_i\}, n, N) = \frac{N!}{n^N \prod_{i=0}^{n} I_i!},$$ (11)

where $I_i$ is the reconstructed image value in pixel i in units of $\sigma$. The definition of the number of distinguishable events in a pixel is somewhat arbitrary.

A level of $1\sigma$ is used to indicate "distinguishability" of an event. A value of $2\sigma$, for example, is not appropriate since 95% confidence is not required before an event is "distinguishable". Variations in the definition of the level required for a distinguishable event will modify the detailed solution.

The image pixel grid is now ready to be improved over the data pixel grid. There are many reasons to believe that the data pixel grid is non-optimal for representing the image. For example, each pixel value represents an independent degree of freedom that can be adjusted in the image. In regions of the data where there are little or no photon counts, these degrees of freedom (i.e., pixels) over-specify the image and are not needed in the model. In this instance, it would be beneficial to eliminate or reduce their number. In high SNR portions of the image, the density of pixels might be too sparse to adequately represent the image. Here, it would be helpful to add more cells, increasing the degrees of freedom used to describe the data. Mathematically, the properties of p(I|M) can be derived from the random process of throwing N indistinguishable "balls" (units of information) into n "buckets" (image cells). This random process is already described in equation 11, i.e., $$p(I \mid M) = p(\{N_i\}, n, N) = \frac{N!}{n^N \prod_{i=0}^{n} I_i!}.$$ (12)

It is this probability that must be maximized, consistent with the GOF, in order to maximize p(I,M|D) in equation 9.

The key step in performing optimal modeling of the image is maximizing p(I,M|D) by choosing generalized image cells or units to maximize p(I|M). These cells are "pixons" which have their origin not in the instrument used to obtain the data, but in the data itself. Equation 12 shows that a pixon's size, shape, and position is based on the local SNR or information density. Equation 12 also shows that p(I|M) is maximized by using the smallest number of cells containing the greatest amount of information.

In selecting the pixon basis, the goal is to be as general as possible in order to maximize p(I,M|D) over the largest possible solution space. A first attempt at deriving a prescription for a pixon is to assume that they are identical, i.e., each contains the same amount of information or $I_i=N/n$. The uniform pixon basis (UPB) is $$p(I \mid M) = p_{UPB}(n, N) = \frac{N!}{n^N (N/n)^n}.$$ (13)

Having set $I_i=N/n$, the probability $p(I|M)=p_{UPB}(n,N)$ can be further maximized by manipulating n. (Note that depending on the details of the propagation properties of the noise, changing n by changing how the signal is divided into pixon cells also changes N.) For N>n, i.e., the usual case, $p_{UPB}$ increases as n is decreased. Referring to the earlier analogy, if there are more "balls" than "buckets", decreasing the number of buckets is beneficial since p(I|M) increases. If N<n, equation 13 breaks down, since it is not possible to set $I_i=N/n$. In this case, the probability $p(I|M)=p(\{I_i\},n,N)$ is maximized by setting $i_i=1$ and eliminating empty cells.

The procedure for UPB image reconstruction is to find the combination of I and M which has the smallest number of indistinguishable pixons and best GOF value. This procedure is essentially a Super-ME method compared with standard ME approaches, which must fit the data and, thus, are never able to maximize the entropy completely. In the present method, the entropy is exactly maximized. Furthermore, since the number of cells used in the UPB image representation is typically much fewer than the total number of data pixels, the resulting image prior, i.e., p(I|M), is superior to that of standard ME methods. The difference between the two methods can be seen by comparing the value of $$p_{ME}(I \mid M) = \frac{N!}{n^N_{pixels} \prod_{i=0}^{n} I_i!}$$

where $I_i \neq N/n_{pixels}$ to $$p_{UPB}(I \mid M) = \frac{N!}{(n^N (N/n!))^n}$$

where n<$n_{pixels}$.

To provide a rough analogy, using the UPB representation is the mathematical equivalent of imaging the sky with a CCD containing variable pixel positions and sizes in a manner in which each pixel collects the same number of photons.

To provide an illustration of the numerical procedure Gaussian pixons are used, although other shapes may also be used. The technique iteratively calculates a pseudo-image which is defined on the data pixel grid. This pseudo-image is not the true image, but is used along with the data pixel grid to perform the numerical calculations required to generate the pixon distribution and the resulting image. A Gaussian pixon width is assigned to each pixel in the pseudo-image and each pixel i in the pseudo-image is averaged together with its neighbor to form the image. The image,I, is defined as $$I(x, y) = \frac{1}{2\pi\delta^2(x,y)} \int dx'dy' I_{psuedo}(x', y') \exp\left(-\frac{(x'-x)^2 + (y'-y)^2}{2\delta^2(x,y)}\right) \quad (14)$$

where $I_{pseudo}$ is the pseudo image and $\delta(x,y)$ is the pixon Gaussian width at pixel position (x,y). Smoothing the pseudo-image with the local pixon width has the effect of correlating the pixel values in the pseudo-image, thereby greatly reducing the number of degrees of freedom in the image. Hence, while the number of degrees of freedom in the pseudo-image is equal to the number of pixels in the data grid, the number of degrees of freedom (DOF) in the image is roughly equal to $$DOF = \sum_i \frac{1}{2\pi\delta_i^2} \equiv n_{pixons}, \quad (15)$$

where $n_{pixons}$ is the number of pixons in the image and $\delta_i$ is the standard deviation of the Gaussian pixon width assigned to pixel i in the pseudo-image.

While the goal of image reconstruction is to maximize p(D|I,M)p(I|D), an approximate method is chosen to maximize this function. Using the Maximum Residual Likelihood (MRL) statistic of Piña and Puetter, *Incorporation of Spatial Information in Bayesian Image Reconstruction: The Maximum Residual Likelihood Criterion,* Publications of the Astronomical Society of the Pacific, No. 104, pp. 1096–1103, November 1992, $$p(D|I,M) = p_{\chi^2}(E_R), \quad (16)$$

where the MRL statistic, $E_R$, is given by $$E_R = \chi A_R^2 = \sum_{i=1}^{n} \frac{(A_R(i) - \langle A_N(i)\rangle)^2}{\sigma A_N(i)^2}, \quad (17)$$

and $p_{\chi^2}$ is the $\chi^2$-distribution, $A_R$ is the autocorrelation function of the residuals. The $\chi^2$-distribution of $E_R$ maximized at $E_R = m-2$, where m is the number of degrees of freedom, in this case, the number of autocorrelation lag terms included in $E_R$. To start the reconstruction, an MRL reconstruction is performed without any concern for image prior values. Typically, several lag terms are chosen around a lag of zero. The resulting MRL restoration is used as the initial pseudo image. A large number of Gaussian UPB pixons are selected and the number is iteratively reduced until the smallest number of pixons is attained which can still achieve a value of $E_R$ within a small tolerance of m-2. Typically, $E_R$ should at least reach m. At the start of reconstruction, values of $E_R$ are usually in the $10^6$ to $10^{10}$ range, depending on the image and SNR. The resulting reduction of $E_R$ to m, which is typically on the order of 10, is a significant improvement in the GOF.

To select the local pixon size, i.e., $\delta_i$(located at position (x,y) in the image), a SNR value is selected for all pixons. The value of $\delta_i$ is iteratively solved, providing the SNR value at each pixel. The local image SNR value, i.e., the SNR value of a pixon, is determined by integrating all of the signal in the pixon and dividing by the noise contained within the pixon, i.e., $$SNR_{pixon(x,y)} = \frac{\int dx'dy' I_{psuedo}(x', y')\Phi_{pixon(x,y)}(x', y')}{\left(\int dx'dy' \sigma^2(x', y')\Phi_{pixon(x,y)}(x', y')\right)^{1/2}}, \quad (18)$$

$$\Phi_{pixon(x',y')}(x', y') = \frac{1}{2\pi\delta^2(x,y)} \exp\left(-\frac{(x'-x)^2 + (y'-y)^2}{2\delta^2(x,y)}\right), \quad (19)$$

where $\Phi_{pixon(x',y')}$ describes the Gaussian shape of a pixon located at the coordinates (x,y), and $\sigma(x,y)$ is the standard deviation of the noise per root pixel in the pseudo-grid at position (x,y). The local pixon size can be determined from equations 18 and 19 by iteratively solving for $\delta$ once the UPB SNR is set. By slowly increasing the SNR value, the total number of pixons used in the image reconstruction is reduced. As mentioned above, $n_{pixons}$ is no longer decreased when $E_R$ can no longer be reduced to a value of m.

The basic numerical procedure which is used to reduce $E_R$ to a value of m is the Polak-Ribiere variant of the Fletcher-Reeves multi-dimensional conjugate minimization method. The variables used in the minimization procedure are the pixel values in the pseudo-image.

A second basis for defining a pixon uses fractal concepts. In determining the fractal dimension of a geometric object a quantity is calculated which changes as a scale or measurement precision changes. The commonly used box-counting dimension, which is closely related to Hausdorff dimension, of a curve (surface or higher dimensional object) is defined in terms of how many cells, i.e., squares, cubes, or hypercubes, contain pieces of the curve as the cell size is changed. This is related to the use of pixons and how the size of pixons impacts the goodness-of-fit.

In forming the UPB image model, a pseudo-image was calculated on a pseudo-grid, and a local scale was determined for each point of the pseudo-grid to define pixon size. The image was then set equal to the pseudo-image convolved with the pixon kernel (or shape) function of the local width, i.e., $$I(x') = \int d V_y K_{pixon}(x' - y') I_{psuedo}(y'), \quad (20)$$

where $I_{pseudo}(x')$ is the pseudo-image and $K_{pixon}(x')$ is the pixon shape function with width given by the local pixon size at position x'. This image is convolved with the point-spread-function (PSF) and compared to the data to determine the GOF. As before, using equation 20, the pixons are not cells with sharp boundaries, but are, in fact, "fuzzy". However, since the image values on the pseudo-grid are correlated, the number of degrees of freedom in the image are significantly less than the number of pseudo-pixels. This means that at every point in the image there is a local scale over which the image is smooth. In fact, the "pixon map", i.e., the "image" containing all of the pixon sizes, directly determines the local resolution obtained in the image reconstruction. This can be useful in the practical application since the method explicitly provides the actual value of the resolution achieved at each location in the reconstruction.

Using fuzzy pixons, it is known that at each point in the image, a pseudo-image is going to be smoothed over a local scale. If the true image is smoothed with pixons of very small width, the value of the smoothed image changes inappreciably, i.e., there is no change for convolution with a $\delta$-function. As the widths of the pixons are increased, deviations of the smoothed value from the unsmoothed value become appreciable, especially when the pixon size exceeds the local smoothness scale of the image. A deviation becomes "appreciable" when it exceeds the local noise. Thus, the largest local smoothing consistent with the tolerance set by the noise is the goal.

The pixon basis which is selected in this manner is the Fractal Pixon Basis (FPB). For practical implementations, the pixon shape functions are commonly limited to radially symmetric functions. Generally, there appears to be little practical difference in the quality of the reconstruction so long as the pixon shape is centrally concentrated and has a finite "foot print". Pixons with infinite extent, e.g., Gaussian shape, have difficulties reconstructing images with high contrast since there is "leakage" of signal from bright sources into the low signal level regions of such pixons. Here, parabolic pixons are used, i.e., $$K_{pixon}(x')=1-\|x'\|^2/\delta, \tag{21}$$

with $K_{pixon}(x')=0$ for $\|x'\|>\delta$, where $\delta$ is the pixon width, since they are quick and easy to calculate. Again providing an analogy to astronomical imaging, using the FPB representation is the mathematical equivalent of taking a picture with a CCD with pixels of variable position and size which are adaptively tuned to match the local structural scale of the image.

Use of a pixon basis to represent the image greatly reduces the number of degrees of freedom in the image reconstruction. This not only improves the formal probability of the image prior, but helps in the practical issues of fitting the data by alleviating problems associated with spatially correlated residuals. By contrast, simply using the image pixel values on a grid identical to the data pixel grid usually means that there are many unconstrained degrees of freedom. In astronomical imaging, the unconstrained degrees of freedom typically far outnumber the degrees of freedom actually required to fit the data. It is these unconstrained degrees of freedom that accumulate large residuals under bright sources, causing photometry errors and giving rise to spurious features.

In addition to the above considerations, it is important to note that use of a pixon model for the image has considerable implications for the GOF criterion. A given pixon representation implies not only how many degrees of freedom there are in the image, but where they lie spatially. The degree of freedom density map in image space is given by:

$$dn_{DOF}(x'_0)/d(\text{pixel}) = 1 \bigg/ \int_{pixel} d\,V_y K_{pixon}(x'-x'_0) \tag{22}$$

where $dn_{DOF}(x')/d(\text{pixel})$ is the density of degrees of freedom per pixel, $x_0'$ is the pixel center, and $K_{pixon}(x'-x_0')$ represents the pixon shape function with a width given by the local scale at $x_0'$. These degrees of freedom are mapped into data space through convolution with the PSF. This is to be contrasted with the canonical $\chi^2$-value of the residuals as the GOF parameter. In the usual expression for the $\chi^2$-value, each of the pixel residuals is counted with equal weight. This implies that each is an independent degree of freedom, which is at odds with the above description of the number and location of the true degrees of freedom present in the image and data.

Following the above analysis, the appropriate value for $\chi^2$ should be calculated with weights appropriate to the degree of freedom density in data space. However, using a pixon basis in image space alone appears to be sufficient. Even though the GOF statistic is calculated assuming that each of the pixel residuals are independent degrees of freedom, enforcement of pixon smoothing in image space restricts the solution to the same region of solution space that would be obtained by recasting the GOF criterion solely in terms of the true degrees of freedom. One desirable aspect of recasting the GOF, however, would be that the new GOF criterion would become independent of the number of pixels in the image. This is an undesirable trait of the $\chi^2$ statistic based on the pixel residuals, i.e., a GOF statistic should not change its value simply by including or excluding more pixels around the periphery of the image. However, this does occur with a $\chi^2$ statistic. In fact, by including enough peripheral pixels into the calculation of $\chi^2$, an arbitrarily good GOF value can be obtained independent of how well the signal is fit in the central, important sections of the image.

Figures 3A, 5A:
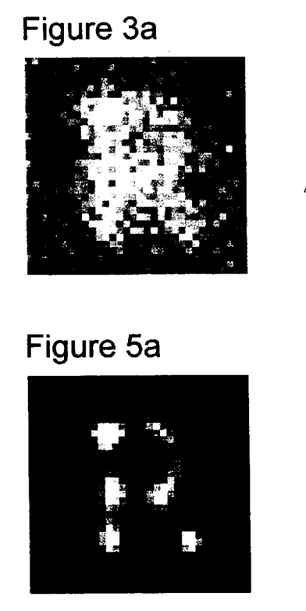
FIGS. 3a and 3b are diagrams of input data (3a) and a surface plot of the input data(3b), respectively.
FIGS. 5a through 5c are diagrams of a reconstructed image (5a), a surface plot of the reconstructed image (5b), and the residuals (5c), using the UPB basis.

FIGS. 3a through 6c present image reconstructions of a mock data set, i.e., a data set in which the exact answer is known a priori. The input data, shown in FIG. 3a is a blurred image of the letter "R" at a signal-to-noise ratio of 3 on the peak pixel. (SNR=3 was selected to provide an extreme test of the various algorithms.) FIG. 3b is a surface plot of the input image. The true image is shown in FIG. 2. The produce the input image, the true image was blurred with a Gaussian PSF of FWHM=6 pixels, and Gaussian noise was added. FIG. 4a presents the results for a pure MRL GOF construction, labeled as "Prior Art". No prior image was used. This, or a similar construction, is used as a prior image to initiate the UPB and FPB construction procedures. FIG. 4b is a surface plot of the MRL GOF construction, and FIG. 4c shows the residuals with no spatial correlation.

Figure 5B:
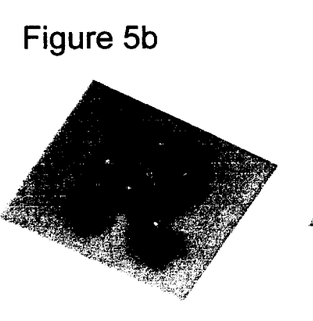
Figure 5C:
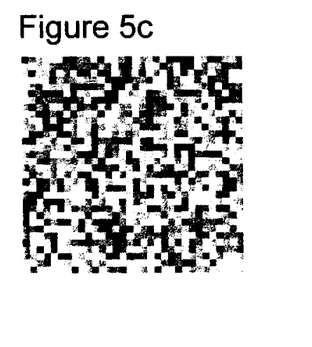

The UPB/MRL construction is illustrated in FIG. 5a, showing a sharper, more uniform brightness than the pure MRL construction. The surface plot of the UPB/MRL is provided in FIG. 5b. The residuals illustrated in FIG. 5c are nearly identical to those for the pure MRL, showing no spatial correlation.

Figures 3B, 6A:
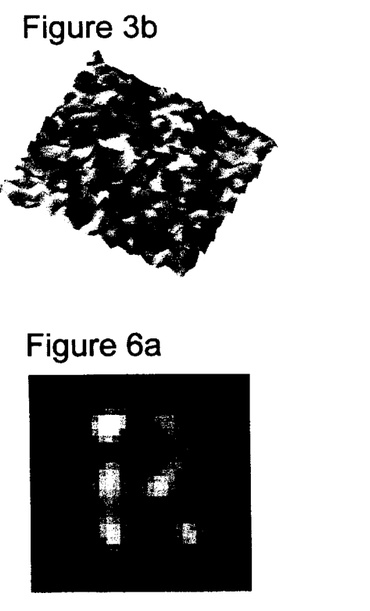
FIGS. 6a through 6c are diagrams of a reconstructed image (6a), a surface plot of the reconstructed image (6b), and the residuals (6c), using the FPB basis.
Figure 4B:
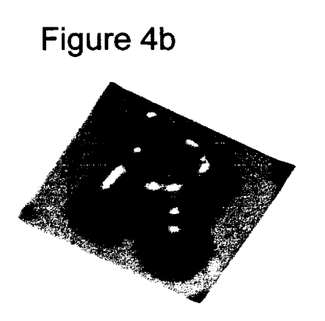
Figure 4C:
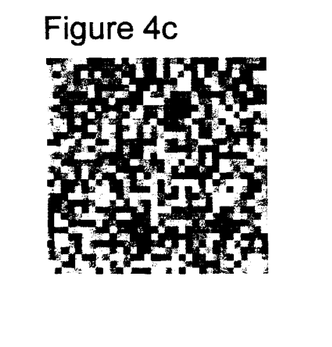
Figure 6B:
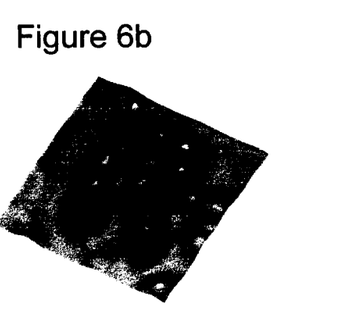
Figure 6C:
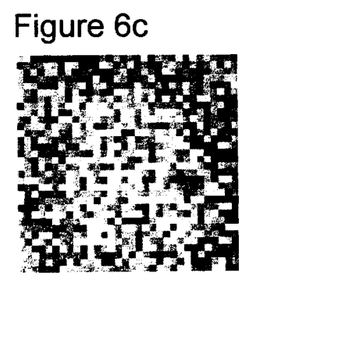

The FPB reconstruction using the canonical $\chi^2$-statistic of the residuals is shown in FIG. 6a with even sharper than the UPB image. Higher peak values are evident in the surface plot of FIG. 6b. As before, there is no spatial correlation in the residuals shown in FIG. 6c. This FPB reconstruction used roughly 100 pixons to provide the image. This can be compared to the 32×32 (=1024) pixels in the image, each of which is a degree of freedom in standard image reconstruction approaches.

The above described procedures for reconstructing an image from raw data from a CCD array are provided as an illustration of the general process of using pixons in Bayesian estimation. Pixons are equally applicable to image construction of time series data from, for example, IR detectors used in infrared astronomy, and to image reconstruction used in magnetic resonance imaging.

Another application is in data compression where the key concept of maximizing the "image" prior allows minimization of the degrees of freedom. The encoded signal would then have maximal compression without losing any information. In principle, the data could not be compressed any further. Data compression is accomplished by maximizing the goodness-of-fit to determine a preliminary encoded signal to a certain precision, then defining a initial pixon map to fit the preliminary encoded signal. The process would be repeated with the goodness-of-fit and pixon definition being adjusted until the desired level of precision is attained with the smallest possible number of pixons.

It will be evident that there are additional embodiments and applications which are not specifically included in the detailed description but which fall within the scope and spirit of the invention. The specification is not intended to be limiting, and the scope of the invention is to limited only by the appended claims.

We claim:

1. A method for reconstructing a detected image from input data carried by a detected image signal generated by a detector array having a plurality of detector elements using Bayesian estimation, said input data comprising a plurality of data points, the method comprising the steps of:

maximizing a goodness-of-fit between said input data and a most likely image given an estimated model;

identifying an image prior by determining a most likely model given the most likely image;

selecting a plurality of generalized image cells within the image prior, said plurality of generalized image cells corresponding substantially to portions of the detected image, each generalized image cell having a size, a shape and a position within said detected image based upon a local signal-to-noise ratio within said detected image signal;

repeating the steps of maximizing a goodness-of-fit, identifying an image prior and selecting a plurality of generalized image cells until the quantity of said generalized image cells is the smallest quantity of said generalized image cells capable of containing the greatest possible collective quantity of said data points and a maximum goodness-of-fit threshold can be reached; and providing an unblurred output image representative of said detected image with the blurring removed.

2. A method as in claim 1 wherein said size, said shape and said position of said generalized image cells are selected so that all generalized image cells are identical and contain the same quantity of said data points.

3. A method as in claim 1 wherein said generalized image cells are selected according to the relationship $$p(\{N_i\}, n, N) = \frac{N!}{n^N \prod_{i=0}^{n} I_i!},$$

where $p(\{N_i\}, n, N)$ is the probability of obtaining the set $\{N_i\}$ where $N_i$ is the number of distinguishable events in image cell i, N is the input data, n is the number of generalized image cells, and $I_i$ is a reconstructed image value in image cell i.

4. A method as in claim 1 wherein the size and the position of said generalized image cells are varied to match a local structural scale of the image prior.

5. A method as in claim 1 wherein the step of maximizing the goodness-of-fit comprises using a standard chi-square distribution.

6. A method as in claim 1 wherein the step of maximizing the goodness-of-fit includes incorporating prior knowledge that any noise within said detected image signal should show no spatial correlation.

7. A method as in claim 1 wherein the quantity of said generalized image cells is substantially smaller than the quantity of detector elements in the detector array.

8. A method for constructing a usable encoded signal from an input signal containing unusable input data, said input data comprising a plurality of data points, using Bayesian estimation, comprising the steps of:

determining an encoded signal prior to a first precision tolerance by maximizing a goodness-of-fit of said unusable input data with the most likely encoded signal given an estimated model;

selecting a plurality of generalized code cells within the encoded signal prior, each generalized code cell having a value based upon a local information density of said unusable input data within the encoded signal prior;

repeating the steps of determining an encoded signal prior and selecting a plurality of generalized code cells until the quantity of said generalized code cells is the smallest quantity of said generalized code cells capable of containing the greatest possible collective quantity of data points and a maximum goodness-of-fit threshold is reached; and providing a usable output encoded signal with a desired precision tolerance representative of said unusable input data.

9. A method as in claim 8 wherein each said generalized code cell has a plurality of dimensions, said plurality of dimensions being selected so that all generalized code cells are identical and contain the same quantity of said data points.

10. A method as in claim 8 wherein said generalized code cells are selected according to the relationship $$p(\{N_i\}, n, N) = \frac{N!}{n^N \prod_{i=0}^{n} I_i!},$$

where $p(\{N_i\}, n, N)$ is the probability of obtaining the set $\{N_i\}$ where $N_i$ is the number of distinguishable events in code cell i, N is the input data, n is the number of generalized code cells, and $I_i$ is a reconstructed code value in code cell i.

11. A method as in claim 8 wherein the size and the position of said generalized code cells are varied to match a local structural scale of the encoded signal prior.

12. A method as in claim 8 wherein the step of maximizing the goodness-of-fit comprises using a standard chi-square distribution.

13. A method as in claim 8 wherein the step of maximizing the goodness-of-fit includes incorporating prior knowledge that any noise within said input signal should show no spatial correlation.

14. A method as in claim 8 wherein said usable encoded signal comprises a compression of said unusable input data.

15. A method as in claim 8 wherein said usable encoded signal comprises an unblurred image and said unusable input data comprises a blurred detected image.

16. A method for reconstructing an unblurred image from a blurred input image data signal generated by a detector array having a plurality of detector elements using Bayesian estimation, the method comprising the steps of:

maximizing a goodness-of-fit of input data within said input image data signal with a most likely image given an estimated model;

identifying an image prior by determining a most likely model given the most likely image;

selecting a plurality of pixons within the image prior, said plurality of pixons corresponding substantially to portions of a blurred input image, each pixon having a size, a shape and a position within said blurred input image based upon a local signal-to-noise ratio of said blurred input image signal;

repeating the steps of maximizing a goodness-of-fit, identifying an image prior and selecting a plurality of pixons until the quantity of said pixons is the smallest quantity of said pixons capable of containing the greatest possible collective quantity of data points of said input data and a maximum goodness-of-fit threshold is reached; and providing an unblurred output image corresponding to a true image within said blurred input image signal.

17. A method as in claim 16 wherein said size, said shape and said position of said pixons are selected so that all pixons are identical and contain the same quantity of said data points.

18. A method as in claim 16 wherein said pixons are selected according to the relationship $$p(\{N_i\}, n, N) = \frac{N!}{n^N \prod_{i=0}^{n} I_i!},$$

where $p(\{N_i\}, n, N)$ is the probability of obtaining the set $\{N_i\}$ where $N_i$ is the number of distinguishable events in pixon i, N is the input data, n is the number of pixons, and $I_i$ is a reconstructed image value in pixon i.

19. A method as in claim 16 wherein the size and the position of said pixons are varied to match a smoothness on a local structural scale of the image prior.

20. A method for reconstructing a blurred input image from a noisy signal having blurred input image data generated by a detector array using Bayesian estimation to generate an unblurred output image, wherein the goodness-of-fit is maximized by determining the most likely image given an estimated model and an image prior is identified by determining the most likely model given the most likely image, the improvement comprising:

selecting a plurality of pixons within the image prior, said plurality of pixons corresponding substantially to portions of said blurred input image, each pixon having a size, a shape and a position within said blurred input image based upon local signal-to-noise ratio of said noisy signal, the quantity of said pixons being the smallest quantity of said pixons containing the greatest possible collective quantity of data points of said blurred input image data and satisfying the requirement that a maximum goodness-of-fit threshold is attained.

21. A method for constructing a usable encoded signal from an input signal carrying unusable input data using Bayesian estimation wherein the usable encoded signal is determined to a first precision tolerance by maximizing the goodness-of-fit by determining the most likely encoded signal given an estimated model and identifying the most likely encoded signal as an encoded signal prior, the improvement comprising:

selecting a plurality of pixons within the encoded signal prior, each pixon having a pixon value based upon a local information density of said input data, the quantity of said pixons being the smallest quantity of said pixons containing the greatest collective amount of said input data and satisfying the requirement that a maximum goodness-of-fit threshold is attained.

* * * * *

UNITED STATES PATENT AND TRADEMARK OFFICE
CERTIFICATE OF CORRECTION

PATENT NO. : 5,912,993
DATED : June 15, 1999
INVENTOR(S) : Richard C. Puetter; Robert K. Pina It is certified that error appears in the above-identified patent and that said Letters Patent is hereby corrected as shown below:

column 2, line 16; Equation 5: between "p(I/D,M)" and "p(D/I M) p(I/M), please insert -- $\propto$ -- therefor.

column 4, line 57; Equation 9: between "p(I, M/D)" and "p(D/I M) p(I/M), please insert -- $\propto$ -- therefor.

column 6, line 51: in place of "n<$n_{pixels}$", please substitute -- $n \ll n_{pixels}$. -- therefor.

Signed and Sealed this

First Day of February, 2000

Attest:

Q. TODD DICKINSON

*Attesting Officer*     *Acting Commissioner of Patents and Trademarks*